United States Patent [19]

Geschickter

[11] 3,862,936
[45] Jan. 28, 1975

[54] MANNICH DERIVATIVES OF 4,4'-DIHYDROXY-3,3'DINITROBENZOPHENONE

[75] Inventor: Charles F. Geschickter, Fairfax, Va.

[73] Assignee: The Geschickter Fund for Medical Research, Washington, D.C.

[22] Filed: Jan. 24, 1973

[21] Appl. No.: 326,243

[52] U.S. Cl. .... 260/246 B, 260/268 BI, 260/268 R, 260/268 H, 260/293.64, 260/326.1, 260/326.5 G, 260/570 R, 424/248
[51] Int. Cl............................................ C07d 87/40
[58] Field of Search ....... 260/570 R, 268 BI, 268 R, 260/268 H, 246 B, 326.5 G, 293.6

[56] References Cited
UNITED STATES PATENTS
2,806,032   9/1957   Geschickter.................... 260/247.5

Primary Examiner—Donald G. Daus
Assistant Examiner—Jose Tovar

[57] ABSTRACT

Di-Mannich derivatives of 4,4'-dihydroxy-3,3'-dinitrobenzophenone are provided. The compounds have chemotherapeutic properties particularly useful as anti-viral agents and in the treatment of prostatic hypertrophy and urinary retention.

8 Claims, No Drawings

MANNICH DERIVATIVES OF 4,4'-DIHYDROXY-3,3'DINITROBENZOPHENONE

BACKGROUND OF THE INVENTION

This invention relates to diphenolic derivatives and more particularly to di-Mannich derivatives of a diphenolic compound which are therapeutically useful, especially as anti-viral agents and in the treatment of prostatic hypertrophy and urinary retention.

Accordingly, it is an object of this invention to provide novel physiologically active compounds characterized by chemotherapeutic properties useful in the treatment of certain physical disorders and diseases.

It is another object of the present invention to provide novel di-Mannich derivatives of 4,4'-dihydroxy-3,3'-dinitrobenzophenone.

It is a further object of the present invention to provide novel di-Mannich derivatives of 4,4'-dihydroxy-3,3'-dinitrobenzophenone and their therapeutically useful acid addition salts, which are particularly useful as anti-viral agents and in the treatment of prostatic hypertrophy and urinary retention.

These and other objects of the present invention and the manner in which they are accomplished will become apparent from the ensuing description and appended claims.

SUMMARY OF THE INVENTION

The novel compounds of this invention are 4,4'-dihydroxy-3,3'-dinitrobenzophenones having dialkylaminomethyl or heterocyclic substituted Mannich groups in the 5,5' positions of the phenyl nuclei as illustrated in the following general formula:

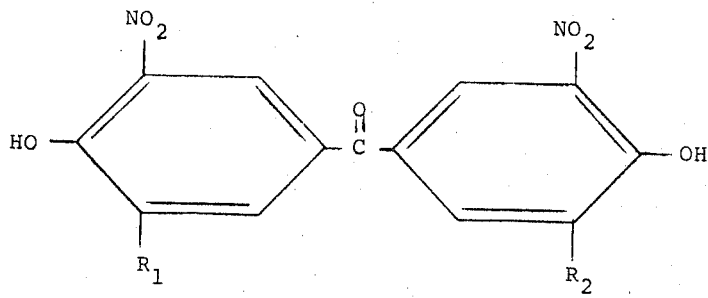

In the above formula $R_1$ and $R_2$ are the same or different Mannich groups selected from (a) a group of the formula

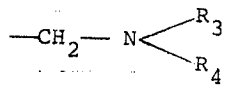

in which $R_3$ and $R_4$ are alkyl groups of from 1 to 6 carbon atoms, and (b) a group of the formula

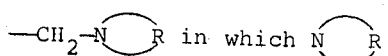

is a cyclic amine selected from pyrrolidine, morpholine, piperidine, piperazine, isoindole, and cycloheptylamine.

DETAILED DESCRIPTION OF THE PREFERRED EMBODIMENTS

The compounds illustrated above are prepared from commercially available 4,4'-dihydroxy-3,3'-dinitrobenzophenone which is reacted with an appropriate amine and formaldehyde in alcohol in a manner well known in the art.

The Mannich groups will be those described above, though it will be understood that one or both of such groups may be substituted without departing from the essence of the present invention. Merely by way of example, one or both Mannich groups may be N-methyl piperazine, 2,6-dimethyl morpholine, etc.

The resulting compounds can be used in their free base form or in the form of their non-toxic, simple acid addition salts, examples of which are the chlorides, iodides, bromides, sulfates, acetates, succinates, maleates, phosphates, benzoates, lactates and the like. In general, those non-toxic salts which are soluble in water or other well-tolerated solvents, are particularly useful for therapeutic purposes due to the ease with which the salt solutions may be administered.

The following examples will further illustrate the invention:

EXAMPLE 1

Preparation of Di-Mannich Derivative of 4,4'-dihydroxy-3,3'-dinitrobenzophenone with N-methyl piperazine 4.56 grams (.015 mole) of 4,4'-dihydroxy-3,3'-dinitrobenzophenone (number 7295, m.p. 200°–203°C. from Fisher Scientific Co.) was dissolved in 15 ml of absolute ethyl alcohol and 5.1 g (.046 mole) of N-methyl piperazine was added. Using a 100 ml flask, the mixture was cooled in an ice bath and 3.75 g (.04 mole) of 37% aqueous formaldehyde was added slowly over a 15 minute period. After standing 1 hour at room temperature, the flask with condenser attached had its contents refluxed for 4 hours in a steam bath. The reaction mixture was then chilled overnight and the product was filtered and washed with 10 ml of cold methanol obtaining approximately 5 g of crude crystalline product, representing an approximate 60% yield. The compound was purified from benzenepetroleum ether mixture yielding a product which was analyzed and determined to have the following formula:

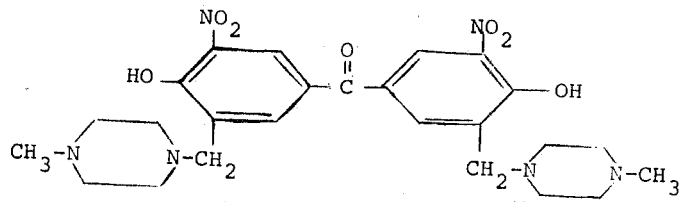

EXAMPLE 2

Preparation of Di-Mannich Derivative of 4,4'-dihydroxy-3,3'-dinitrobenzophenone with dimethylamine The same procedure is followed as in Example 1 except that 1.7 g of dimethylamine is substituted for the N-methyl piperazine. The resulting product is a golden, tasteless powder having a melting point of 225°–277°C.

Other di-Mannich derivatives of 4,4'-dihydroxy-3,3'-dinitrobenzophenone may be prepared in a similar manner.

It is also within the contemplation of the present invention to make di-Mannich derivatives of 4,4'-dihydroxy-3,3'-dinitrobenzophenone having mixed Mannich groups, such as pyrrolidino-morpholino, methyl-ethyl, etc. This may be accomplished using the same techniques employed to form the aforementioned di-Mannich derivatives except that the reaction is terminated before it proceeds sufficiently to form two Mannich groups which are identical.

The toxicity of these compounds is very low, the median lethal dose ($LD_{50}$) of the dimethylamine derivative, for example, being 125 mg/kg in rats.

As previously noted, the compounds of the present invention are useful as anti-viral agents and in the treatment of prostatic hypertrophy and urinary retention. Typical viruses against which the compounds are effective are Rhino and Herpes Viruses.

The compounds of the present invention may be administered intramuscularly as parenteral solutions or orally in the form of tablets, capsules or the like. In humans, intramuscular injections may be given in single dosages of 50 mg/cc. Oral doses of 100 mgm are given twice or three times daily. The compounds are retained in the body for relatively long periods of time so that relief extends overnight and into the next day. The compounds can also be administered topically in a conventional 10% ointment for treatment of viral infections such as those resulting from the Herpes Virus.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A compound of the formula:

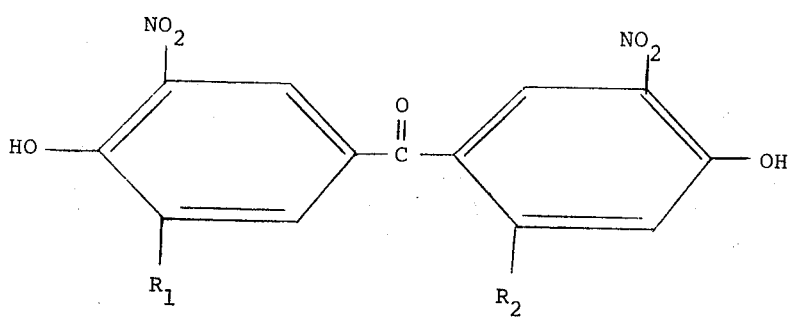

wherein $R_1$ and $R_2$ are the same or different Mannich groups selected from a group of the formula

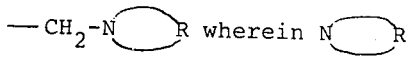

is a cyclic amine selected from pyrrolidine, morpholine, piperidine, piperazine, isoindole, and the non toxic, therapeutically active acid addition salts thereof.

2. The compound having the formula

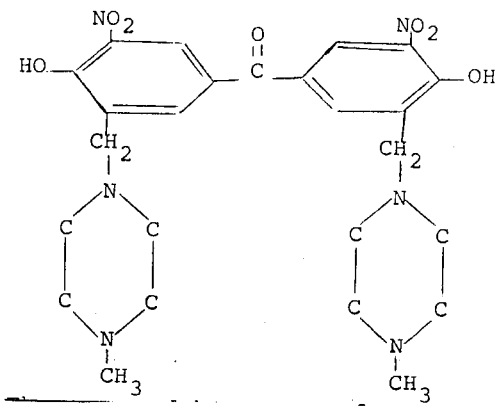

3. The compound having the formula

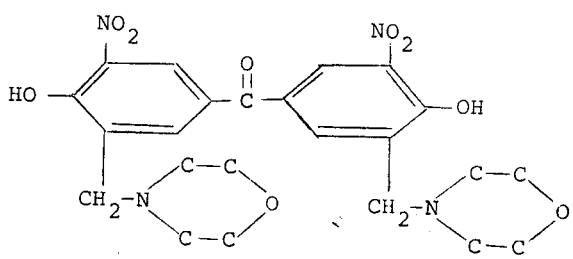

4. The compound having the formula

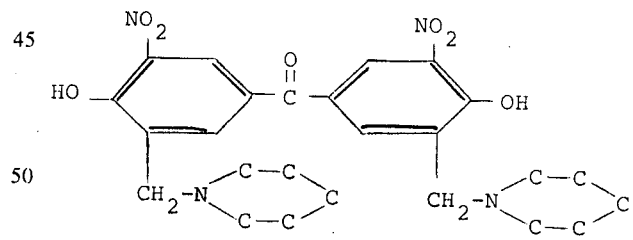

5. The compound having the formula
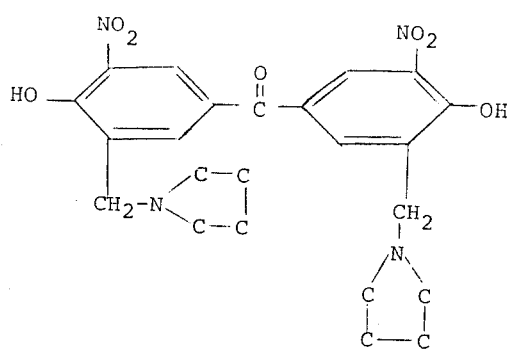
6. The compound having the formula
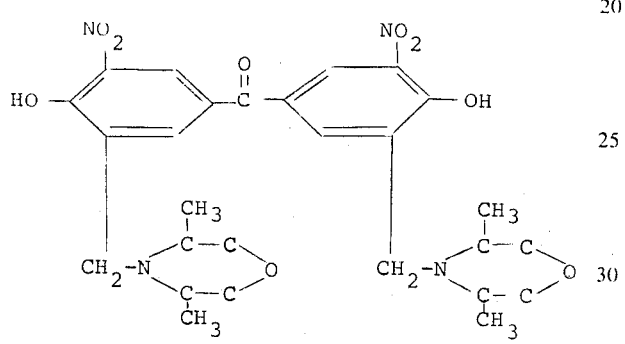
7. The compound having the formula
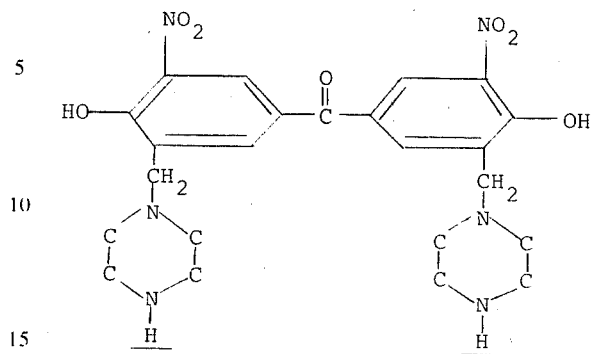
8. The compound having the formula
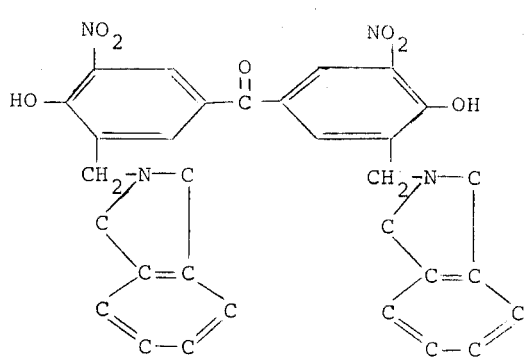
* * * * *